(12) United States Patent
Mazotti et al.

(10) Patent No.: US 7,431,516 B2
(45) Date of Patent: Oct. 7, 2008

(54) OPTICAL SUB-ASSEMBLY PACKAGING TECHNIQUES THAT INCORPORATE OPTICAL LENSES

(75) Inventors: William Paul Mazotti, San Martin, CA (US); Jia Liu, San Jose, CA (US); Luu Thanh Nguyen, San Jose, CA (US); Haryanto Chandra, Sunnyvale, CA (US); Peter Deane, Los Altos, CA (US); Todd Thyes, Appleton, WI (US); Brian Huss, Appleton, WI (US); John Rukavina, Neenah, WI (US); Glenn Woodhouse, Pullman, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/473,820

(22) Filed: Jun. 23, 2006

(65) Prior Publication Data

US 2007/0071391 A1 Mar. 29, 2007

Related U.S. Application Data

(62) Division of application No. 11/050,073, filed on Feb. 1, 2005, now Pat. No. 7,073,961, which is a division of application No. 10/317,841, filed on Dec. 10, 2002, now Pat. No. 6,863,450.

(51) Int. Cl.
*G02B 6/36* (2006.01)

(52) U.S. Cl. ........................................................ 385/94

(58) Field of Classification Search ............ 385/92–94, 385/14, 31, 33, 34, 49, 89
See application file for complete search history.

(56) References Cited

U.S. PATENT DOCUMENTS

| | | | |
|---|---|---|---|
| 4,927,228 A | 5/1990 | Van De Pas | |
| 5,586,208 A | 12/1996 | Nishiyama | |
| 6,075,284 A * | 6/2000 | Choi et al. | 257/676 |
| 6,497,518 B1 | 12/2002 | Deane | |
| 6,715,936 B2 * | 4/2004 | Vaganov | 385/92 |
| 6,724,015 B2 * | 4/2004 | Nelson et al. | 257/99 |
| 6,755,578 B1 | 6/2004 | Mynatt et al. | |
| 2003/0026556 A1 | 2/2003 | Mazotti et al. | |
| 2003/0113074 A1 | 6/2003 | Kohlstadt et al. | |
| 2004/0041521 A1* | 3/2004 | Mandler et al. | 313/512 |
| 2004/0047570 A1 | 3/2004 | Lo et al. | |

* cited by examiner

*Primary Examiner*—Chau N Nguyen
(74) *Attorney, Agent, or Firm*—Beyer Law Group LLP

(57) ABSTRACT

Techniques for manufacturing an optical transmission device in a manner so that the photonic device is protected from damage that can be caused by exposure to the environment and physical handling are described. The invention involves placing a lens or a lens array over a photonic device, either with or without the use of a receptacle device, such that the photonic device is contained within a sealed cavity. The invention has three main embodiments in which the photonic device can be hermetically sealed, quasi-hermetically sealed, or non-hermetically sealed. The optical transmission device can be configured to serve as an optical receiver, detector, or a transceiver device.

17 Claims, 10 Drawing Sheets

OPTICAL SUB-ASSEMBLY PACKAGING TECHNIQUES THAT INCORPORATE OPTICAL LENSES

CROSS-REFERENCE TO RELATED APPLICATIONS

This application is a Divisional of U.S. patent application Ser. No. 11/050,073, filed on Feb. 1, 2005 now U.S. Pat. No. 7,073,961, which is a Divisional of U.S. patent application Ser. No. 10/317,841, filed on Dec. 10, 2002, which is now U.S. Pat. No. 6,863,450, the content of each of which are hereby incorporated by reference.

This application is related to U.S. patent application Ser. No. 09/568,094, entitled "DEVICE AND METHOD FOR PROVIDING A TRUE SEMICONDUCTOR DIE TO EXTERNAL FIBER OPTIC CABLE CONNECTION," filed on May 9, 2000, which is now U.S. Pat. No. 6,364,542, to U.S. patent application Ser. No. 09/568,558, entitled "ARRAYABLE, SCALABLE AND STACKABLE MOLDED PACKAGE CONFIGURATION," filed on May 9, 2000, which is now U.S. Pat. No. 6,707,140, to U.S. patent application Ser. No. 09/947,210, entitled "TECHNIQUES FOR JOINING AN OPTOELECTRONIC MODULE TO A SEMICONDUCTOR PACKAGE," filed on Sep. 4, 2001, which is now U.S. Pat. No. 6,642,613, to U.S. patent application Ser. No. 10/006,443, entitled "TECHNIQUES FOR MAINTAINING PARALLELISM BETWEEN OPTICAL AND CHIP SUB ASSEMBLIES," filed on Nov. 19, 2001, which is now U.S. Pat. No. 6,628,000, to U.S. patent application Ser. No. 09/922,358, entitled "MINIATURE SEMICONDUCTOR PACKAGE FOR OPTOELECTRONIC DEVICES," filed on Aug. 3, 2001, which is now U.S. Pat. No. 6,624,507, to U.S. patent application Ser. No. 10/165,553, entitled "OPTICAL SUB-ASSEMBLY FOR OPTO-ELECTRONIC MODULES," filed Jun. 6, 2002, to U.S. patent application No. 10/165,711, entitled "CERAMIC OPTICAL SUB-ASSEMBLY FOR OPTO-ELECTRONIC MODULES," filed on Jun. 6, 2002, to U.S. patent application No. 09/922,357, entitled "OPTOELECTRONIC PACKAGE WITH DAM STRUCTURE TO PROVIDE FIBER STAND-OFF," filed on Aug. 3, 2001, which is now U.S. Pat. No. 6,655,854, to U.S. patent application Ser. No. 09/957,936, entitled "TECHNIQUE FOR PROTECTING PHOTONIC DEVICES IN OPTOELECTRONIC PACKAGES WITH CLEAR OVERMOLDING," filed on Sep. 21, 2001, to U.S. patent application Ser. No. 09/922,946, entitled "OPTO-ELECTRONIC PACKAGE WITH CONTROLLED FIBER STANDOFF," filed on Aug. 3, 2001, which is now U.S. Pat. No. 6,595,699, the content of each of which are hereby incorporated by reference.

FIELD OF THE INVENTION

The present invention relates generally to optical transmission technologies, and more specifically to packaging techniques that protect photonic devices from damage.

BACKGROUND OF THE INVENTION

Optical signal transmission techniques provide the ability to transmit broad bandwidths of data across large distances. For instance, in comparison to electrical signal transmissions over copper wires, light is attenuated less in fiber than electrons traveling through copper. Therefore multiple data streams within a single optical transmission medium can be transmitted at one time. Also, the light signals travel large distances before they attenuate to a point in which regeneration of the light signals is required.

Optoelectronic devices, which are a combination of optical and electrical components, are used to build optical networks. The optical components generate, receive, and transmit light signals while the electrical components store and process the signals. Such optical components include devices such as light emitting and detecting devices, generally referred to as photonic devices, and optical fibers. Exemplary electrical components are semiconductor integrated circuit devices. Typically, photonic devices are electrically connected to semiconductor devices and the ends of optical fibers are positioned proximate to the active areas of the photonic devices. In this way, the photonic devices emit and detect light signals to and from the optical fibers and the semiconductor devices drive the photonic devices and receive signals from the photonic devices. Examples of such optoelectronic devices are described in U.S. Pat. No. 6,364,542 issued to Deane et al. and in U.S. patent application Ser. No. 10/165,553, entitled "OPTICAL SUB-ASSEMBLY FOR OPTO-ELECTRONIC MODULES," both of which are incorporated by reference.

Although various techniques have been developed to effectively connect the optoelectronic components, improved techniques are still desirable in order to increase the transmission efficiency of optoelectronic devices and overall reliability. For instance, the optical coupling efficiency between photonic devices and optical fibers commonly requires improvement. In one specific aspect, light emitting devices tend to be biased at high voltage levels, thereby emitting light signals that have high intensity levels. These high intensity levels cause the light signals to enter the optical fibers with relatively low efficiency. Also, the durability of optoelectronic devices are commonly limited by the photonic devices, which tend to be delicate devices that are adversely affected by elements such as dust, moisture, printed circuit board mounting flux residues, cleaning residues, and harsh physical handling.

In view of the foregoing, optoelectronic manufacturing techniques to produce more efficient and reliable devices would be desirable.

BRIEF SUMMARY OF THE INVENTION

The present invention is directed to techniques for manufacturing an optical transmission device in a manner so that the photonic device is protected from damage that can be caused by exposure to the environment and physical handling. Such damage can be caused by moisture absorption, dust collection, board mounting flux residues, cleaning residues, wire bonding operations, optical fiber mounting operations, etc. The invention involves placing a lens or a lens array over a photonic device, either with or without the use of a receptacle device, such that the photonic device is contained within a sealed cavity. The optical transmission device can be configured to serve as an optical receiver, detector, or a transceiver device.

According to various embodiments, the present invention provides an optical transmission device that includes a support block, a first photonic device, and a receptacle. The support block includes a supporting surface and a mounting surface. The mounting surface has multiple contact pads. The supporting surface has at least one cathode pad and multiple anode pads. The first photonic device is attached to a respective one of the cathode pads and connected to at least one of the anode pads. The receptacle is attached to the supporting surface with an adhesive material.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to techniques for manufacturing an optical transmission device in a manner so that the photonic device is protected from damage resulting from exposure to the environment and physical handling. Such damage can be caused by moisture absorption, dust collection, board mounting flux residues, cleaning residues, wire bonding operations, optical fiber mounting operations, etc. The invention involves placing a lens or a lens array over a photonic device, either with or without the use of a receptacle device, such that the photonic device is contained within a sealed cavity. The invention has three main embodiments—a hermetically sealed photonic device, a quasi-hermetically sealed photonic device, and a non-hermetically sealed photonic device. The optical transmission device can be configured to serve as an optical receiver, detector, or a transceiver device.

Figure 1:
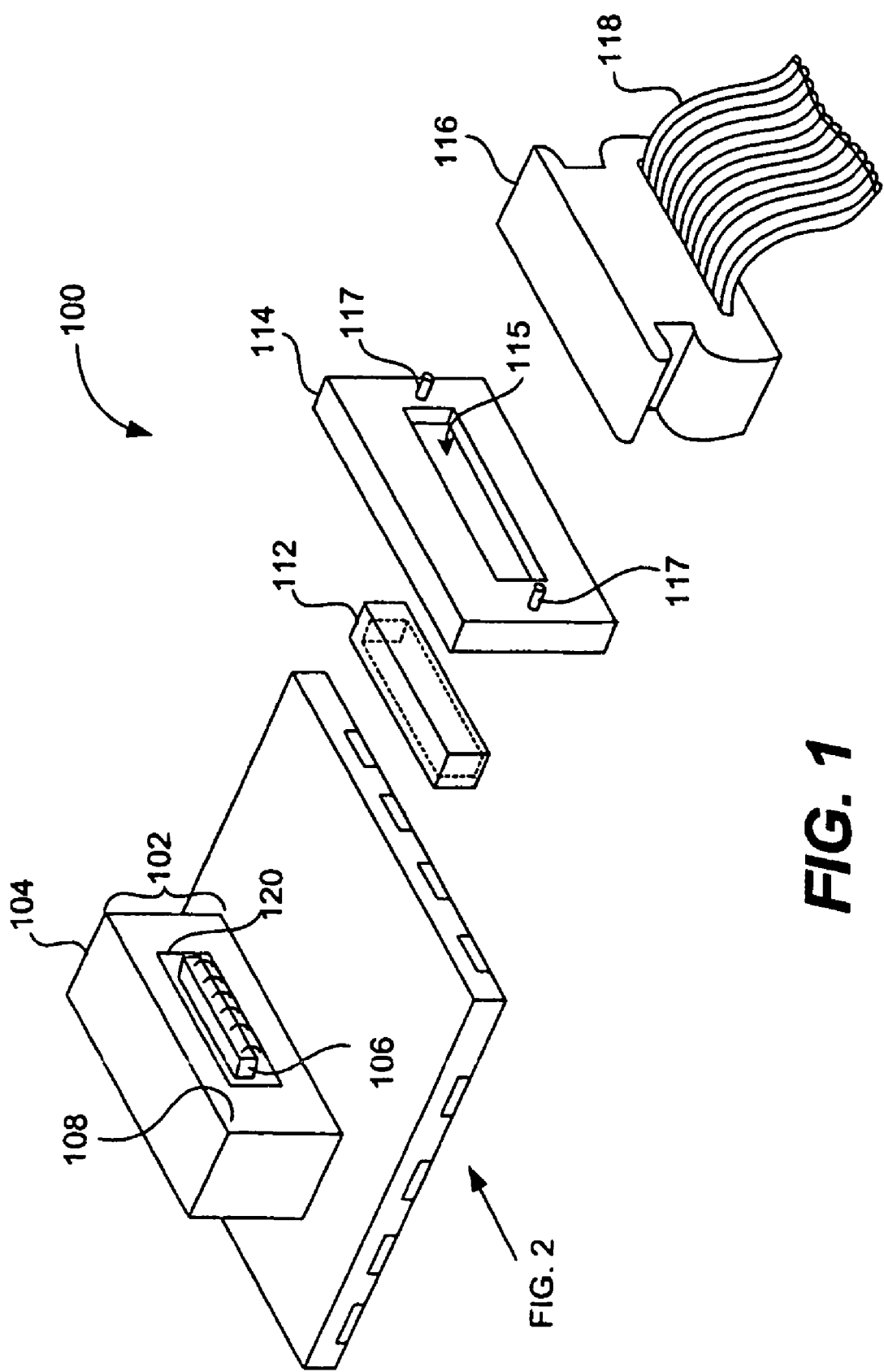
FIG. 1 illustrates one embodiment of an unassembled optoelectronic system designed to protect photonic device 106 within a hermetically sealed environment.

FIG. 1 illustrates one embodiment of an unassembled optoelectronic system 100 designed to protect photonic device 106 within a hermetically sealed environment. Upon assembly, optoelectronic system 100 can be used to convert optical signals to electronic signals and vice-versa. System 100 can be used to build an optical network. Optoelectronic system 100 is made up of the following components. First there is the optical subassembly 102, which includes a support block 104 and a photonic device 106. Photonic device 106 is attached to a front surface 108 of support block 104. Secondly, there is the semiconductor device package (or the chip subassembly) 110, which is a semiconductor integrated circuit (IC) device that is packaged within a protective body. The IC device within package 110 is electrically connected to photonic device 106 in order to send and receive signals from photonic device 106. The IC device and photonic device 106 can be electrically connected by electrical traces that run along or through the body of support block 104.

Thirdly there is a lens 112 that, when assembled, is attached to support surface 108 of support block 104 in order to protect photonic device 106. Lens 112 is shaped like a cap or an open-ended box. Its open-end is to be placed onto the surface of support block 104 so that lens 112 covers photonic device 106 and seals photonic device 106 in a hermetically sealed environment. Then there is a receptacle 114, which is to be attached to lens 112. Then a ferrule 116, which holds optical fibers 118 in place, is attached to receptacle 114. After being fully assembled, optical fibers 118 are in optical communication with photonic device 106 and the optical signals that pass through fibers 118 get translated into electrical signals within chip subassembly 110, and vice-versa.

Figure 2:
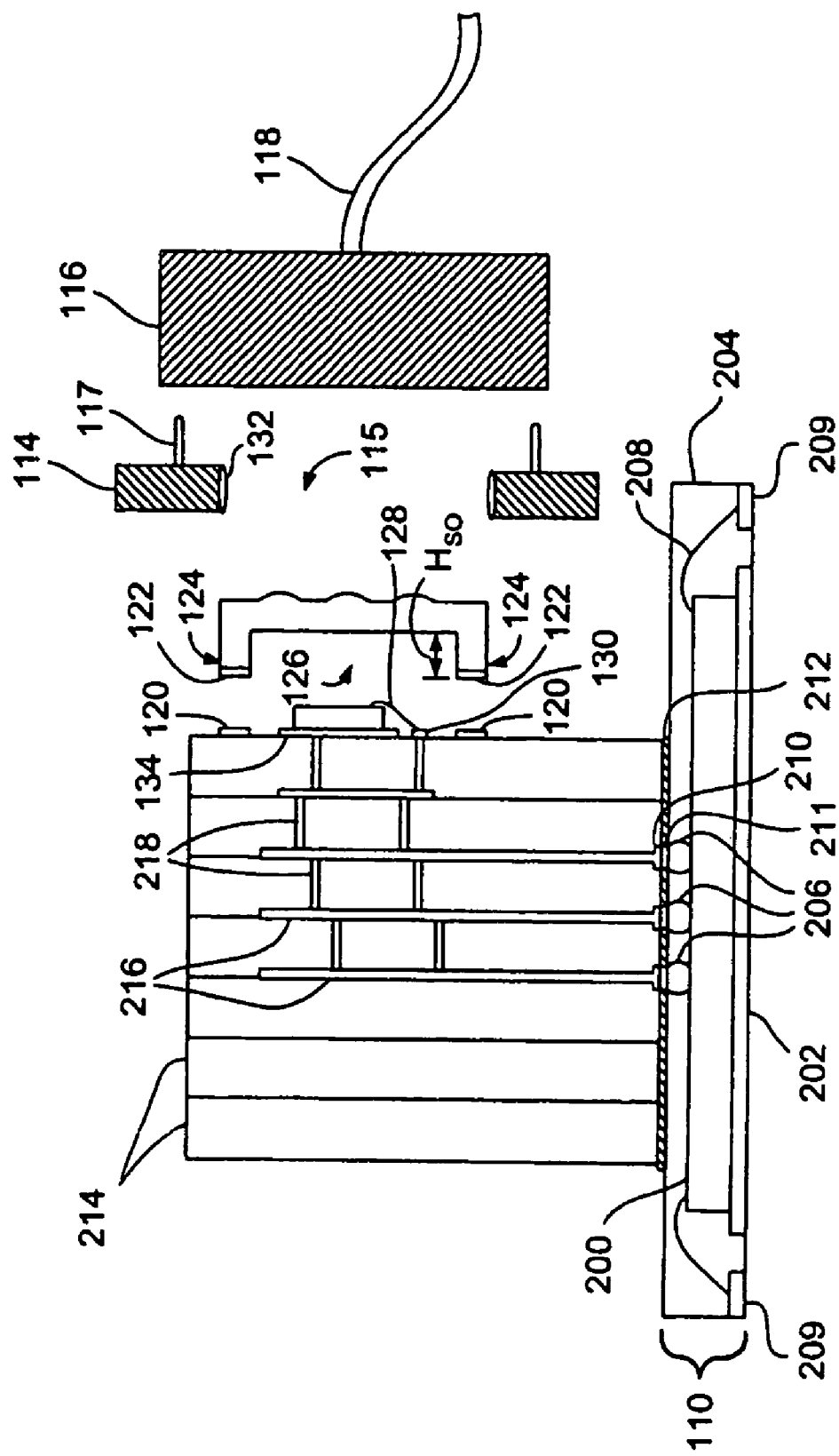
FIG. 2 illustrates a side, cross-sectional view of optoelectronic system of FIG. 1.

FIG. 2 illustrates a side, cross-sectional view of optoelectronic system 100 of FIG. 1. FIG. 2 provides an additional view of optoelectronic system 100 to facilitate a more thorough understanding of the present invention.

The main function of support block 104 is to support photonic device 106 so that optical fibers 118 can conveniently be set in optical communication with photonic device 106. To perform this function, support block 104 is formed to have front surface (or supporting surface) 108 and a bottom surface that is attached to chip subassembly 110. In one embodiment, support block 106 is made of an impermeable material such as a ceramic. An impermeable material prevents moisture to pass through support block 104. By making support block 104 out of an impermeable material, it is possible to hermetically seal photonic device 106 within lens 112. In alternative embodiments, support block 104 can be formed of permeable materials if it is not important to protect photonic device 106 from moisture absorption. For instance, support block 104 could be formed of plastic or FR4.

In one embodiment, lens 112 is made of glass because the impermeable properties of glass is used to ensure a hermetic seal of photonic device 106 between support surface 108 and lens 112. Lens 112 can be formed of molded high-index glass material. Lens 112 can be either a single lenslet or an array of lenslets.

In alternative embodiments in which a hermetic sealing of photonic device 106 is less important, lens 112 can be made of optical grade plastics. This is possible when a solder reflow is not required after the lens 112 is attached to the ceramic support block 102 or the solder reflow can be carried out at relatively low temperature (lower than 220 degrees Celsius).

The cavity within lens 112 is referred to as a lens cavity 126. Lens 112 can be placed over photonic device 106 so that photonic device 106 fits within lens cavity 126. Rim 124 of lens 112 is rectangular shaped, however, it can have a variety of outline shapes. For example, lens 112 could have a rim 124 that has an oval outline shape instead of a rectangular shape.

In order to create a hermetic seal between support surface 108 and lens 112, a line of metal material 120 is formed around the perimeter of photonic device 106. Metal line 120 can be referred to as a metal boundary line 120. A matching line of metal material 122 is formed around a rim 124 of lens 112. Lens 112 is then attached to support surface 108 by placing the lines of metal 120 and 122 together and solder reflowing them together. Metal boundary line 120 acts as a hermetic sealing joint between lens 112 and support surface 108 such that gas and moisture cannot seep between lens 112 and support surface 108. Alternative methods of using a metal connecting joint between support surface 108 and lens 122 can also be utilized.

In order to create a hermetic seal around photonic device 106, the materials used to surround photonic device are impermeable materials. As described above, each of the lens 112, support block 104, and boundary lines 120 are formed of ceramics, metal, or glass. Materials that are not used include those that allow for seepage of moisture, such as polymers and epoxy adhesives. For instance, polymers and epoxy tend to absorb moisture or outgas and therefore introduce moisture or gas into an environment.

Interconnecting wires 128 connect anode pads on the surface of photonic device 106 to anode contact pads 130 on supporting surface 108. Anode contact pads 130 are within the limits of metal boundary line 120 so that they will also be contained within a hermetically sealed environment when lens 112 is attached to support surface 108. Interconnecting wires 128 are typically wirebonded onto photonic device 106 and anode contact pad 130 in such a way that the wires 128 extend outwards from photonic device and then bend back towards anode contact pads 130. Lens cavity 126 should have a stand-off height, $H_{SO}$, that is large enough to allow lens 112 to be placed over photonic device 106 without having interconnecting wires 128 touch the inner surface of lens 112. Standoff height, $H_{SO}$, is the distance between the inside surface of lens 112 and support surface 108 after lens 112 is attached.

By hermetically sealing photonic device 106 between support surface 108 and lens 112, photonic device 106 is protected from the elements, such as dust and moisture. Such elements can adversely affect the operation and reliability of photonic devices. The photonic die, or arrays, will be completely sealed from the outside and no moisture will be able to diffuse into the photonic cavity. The residual moisture within the cavity will depend on the process used during sealing and on the product reliability requirements. Most hermetic packages currently follow Mil Specs of less than 5000 ppm of moisture content. Such protection provides full protection of the photonics during component handling, board assembly, and field operations.

Lens 112 also serves to protect photonic device 106 from physical damage that can be sustained during handling and use.

Lens 112 can also increase the coupling efficiency between optical fibers 118 and photonic device 106. With respect to a light transmitting photonic devices, lens 112 can attenuate the light emitted from photonic device so that the emitted light has a smaller intensity upon entering an optical fiber. This is useful since light transmitting photonic devices are typically biased at higher than needed voltage levels in order to operate at sufficiently high data rates. In turn, this causes the emitted light to have a higher intensity level than it is needed, which causes a safety issue. Therefore, by attenuating the emitted light with lens 112, a safe operation can be achieved while required data rate can be met. On the other hand, with respect to light receiving photonic devices, lens 112 can magnify or focus light received from optical fibers so that a higher intensity light signal can be directed into photonic device 106. This can also increase the coupling efficiency between a photonic device and an optical fiber.

When optoelectronic system 100 supports a light detecting photonic device, it operates as a receiving device. When optoelectronic system 100 supports a light transmitting photonic device, it operates as a transmitter. In some embodiments, optoelectronic system 100 can support both a light detector and a light receiver, thereby making system 100 a transceiver. Optoelectronic system 100 can support one or more photonic devices to create a multi-channel receiver, transmitter, or transceiver. In these embodiments, a single lens 112 can be placed over all of the photonic devices or one lens can be placed over each photonic device. When multiple lenses are used, multiple metal boundary lines 120 should also be formed on support surface 108 and corresponding metal lines 122 should also be formed on the rims of each of lenses 112 in order to form a hermetic seal within each of the lens cavities 126. When a light transmitting and a light emitting photonic device is attached to a support surface 108, two types of lenses can be used. One of the lenses can be a light attenuating lens that is placed over the light emitting photonic device. Another type of lens can be a light magnifying lens that is placed over the light receiving photonic device.

Chip subassembly 110, as seen in FIG. 2, includes a semiconductor die 200 that is mounted on top of a die attach pad 202 and encapsulated within a protective molding material 204. Up-linking contacts 206 are formed on the top surface of die 200 in order to form an electrical pathway to connect die 200 with photonic device 106. Interconnecting wires 208 connect die 200 to chip contact pads 209, which form the contact surfaces through which optoelectronic system 100 can be connected to a printed circuit board or another electronic system. Chip subassembly 110 in FIG. 2 is referred to as a leadless lead frame semiconductor chip package. However, alternative embodiments of chip subassembly 110 that have contact surfaces for both making contact with support block 104 and an external system can also be used. For instance, standard dual in-line packages, ball grid array packages, and quad-flat packages can also be used.

Chip subassembly 110 can have various types of contacts for connection to an electrical system such as a printed circuit board. The contacts can be flush with the side surfaces or extend past the peripheral side surfaces. In this way, the CSA can be hotbar reflowed, surface mount reflowed, pluggable. Also the CSA can have a configuration to allow for mounting onto an edge or anywhere on a printed circuit board.

Up-linking contacts 206 connected to contact pads 210 on the bottom surface of support block 104. Electrically conductive adhesive or solder 211 can be used to secure this connection. Underfill material 212 is used to fill in the gaps between support block 106 and chip subassembly 110 in order to strengthen the connection between the two components.

Receptacle 114 attaches to lens 112 and forms an attachment area for ferrule 116. Ferrule 116 is a device that secures one or more optical fibers 118. As shown in FIG. 1, ferrule 116 secures a ribbon of optical fibers 118. Receptacle 114 has a receptacle opening 115 that allows light from optical fibers 118 to travel through lens 112 in order to reach photonic device 106. Receptacle 114 is attached to lens 112 by inserting lens 112 into the receptacle opening 115. Then adhesive material 132 is used to secure the connection. Adhesive material can be glue since a hermetic seal between receptacle 114 and lens 112 is not critical. In the various embodiments of the invention where a lens is attached to a receptacle, the lens can be attached to the receptacle by either placing the lens within an opening of the receptacle or by attaching the rim of the opening to a front surface of the lens, as will be described in FIG. 3.

Receptacle 114 has alignment pins 117 that guide ferrule 116 into the correct alignment with receptacle 114. Correct alignment between ferule 116 and receptacle 117 ensures that optical fibers 118 will correctly align with photonic device 106. Receptacle 114 can be made to have various sizes and shapes suitable for attaching a ferrule 116 to a lens 112. Manufacturing optoelectronic system 100 involves at least two separate soldering operations. First, solder is used to attach lens array 112 onto support surface 108 of support block 104. Secondly, solder is used to attach optical subassembly 102 onto chip subassembly 110. Proper selection of high-temperature solders is required to follow a manufacturing thermal hierarchy. Exemplary high-temperature solders have high lead content (e.g., 10Sn90Pb, or 5Sn95Pb, or 3Sn97Pb) with melting points greater than 300° C. In other words, manufacturing process steps should expose the optoelectronic system 100 to a hierarchy of decreasing temperature exposure so to not adversely affect the integrity of interfaces and components assembled in earlier steps. For instance, since lens 112 is attached to support surface 108 before optical subassembly 102 is attached to chip subassembly 110, the melting point of the solder used between lens 112 and support surface 108 should be higher than the solder used between optical subassembly 102 and chip subassembly 110. High-temperature solder should be used for sealing lens 112 to support surface 108. Eutectic solder (63Sn37Pb, melting point=183° C.) can be used to connect optical subassembly 102 and chip subassembly 110. By following this temperature hierarchy, the solder seal between lens 112 and support surface 108 can remain intact during the process of attaching optical subassembly 102 to chip subassembly 110.

Epoxy can be used to attach components outside of the lens cavity 126. For instance, epoxy can be used to attach the receptacle to the lens and the ferrule to the receptacle.

Support block 104 is an low temperature co-fired ceramics (LTCC) module that is formed of multiple laminated layers 214 of ceramic material. Metal traces 216 are formed between some of the adjacent ceramic layers 214 and conductive vias 218 that pass through the thickness of the layers 214 connect the metal traces 216. The network of metal traces 216 and conductive vias 218 connect the contact pads 210 with the anode contact pads 130 and a cathode pad 134 on the support surface 108. This network of electrical traces 216 and conductive vias 218 is convenient for maintaining a hermetic seal around photonic device 106 since the traces 216 and vias 218 are not exposed to the environment and therefore do not provide a pathway for moisture to seep into the lens cavity 126.

Figure 3:
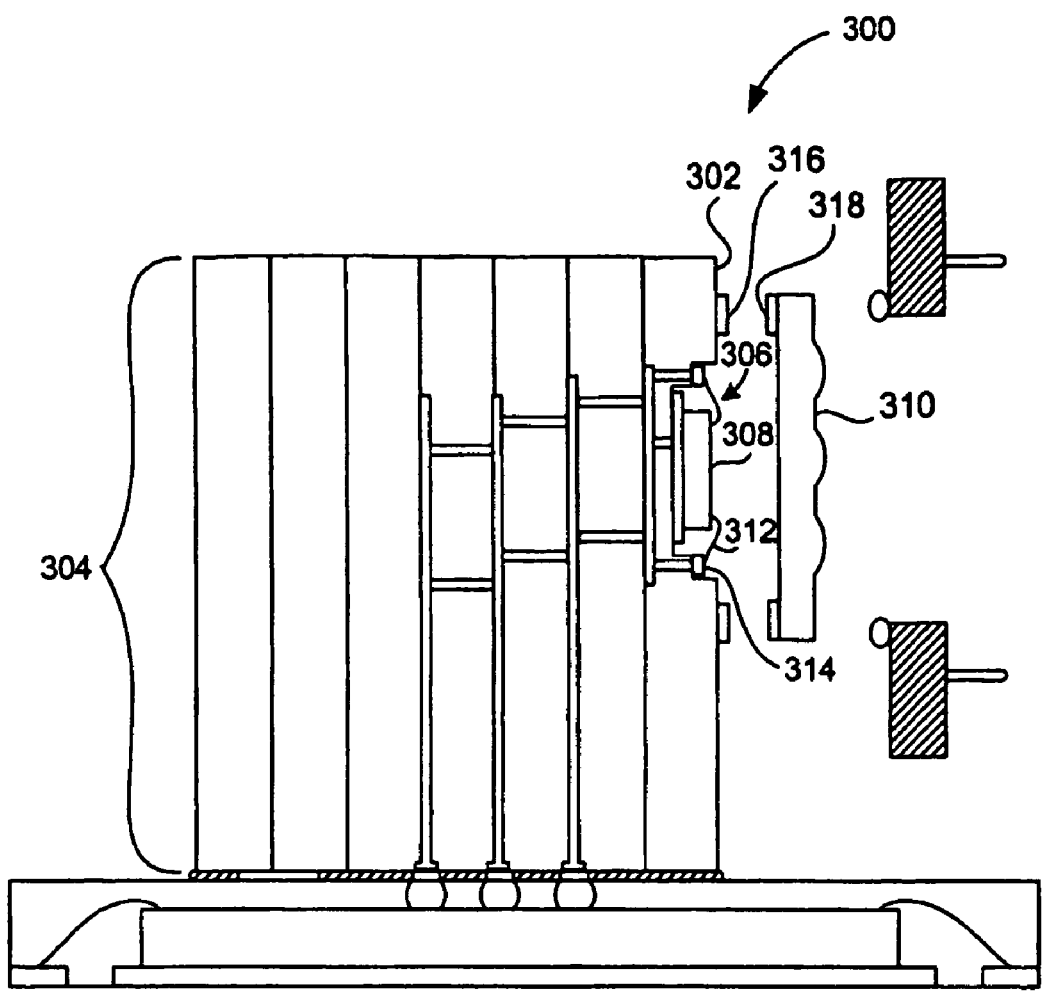
FIG. 3 illustrates an alternative embodiment of an optoelectronic system wherein a photonic device is hermetically sealed.

FIG. 3 illustrates an alternative embodiment of an optoelectronic system 300 wherein photonic device 308 is hermetically sealed. One difference between system 300 and system 100 of FIGS. 1 and 2 is that support surface 302 of support block 304 has a recessed surface cavity 306 and a photonic device 308 sits within surface cavity 306. A second difference is that lens 310 is substantially flat. Surface cavity 306 is recessed to a depth such that when lens 310 is attached to support surface 302, interconnecting wires 312, which extend from the top surface of photonic device 308, do not touch lens 310. The depth of surface cavity 306 depends upon the thickness of photonic device 308 and the height of interconnecting wire 312. The depth of surface cavity 306 should be set so that interconnecting wires 312 do not touch lens 310. In some embodiments, the surface cavity 306 can extend through multiple ceramic layers. In some embodiments, lens 310 can have a cap shape as shown in FIGS. 1 and 2.

Anode contact pads 314 are formed on at a level that is higher than the level upon which the photonic device 308 is set. This allows shorter interconnecting wires 312 to connect photonic device 308 and anode contact pads 314. The height at which anode contact pads 314 can vary depending upon design requirements.

Another difference with optoelectronic system 300 is that photonic device 308 is wirebonded to anode contact pads 314 that are located above, as well as below, photonic device 308.

As with system 100 of FIGS. 1 and 2, optoelectronic system 300 hermetically seals photonic device 308 between surface cavity 306 and lens 310. Impermeable materials are used to form optoelectronic components immediately surrounding photonic device 308. For instance, support block 304 can be formed of ceramic, lens 310 is formed of glass, and metal boundary lines 316 and 318 are used to attach lens 310 to support surface 302 via solder reflow.

Optoelectronic system 300 can also be formed to have multiple surface cavities 306 that each can contain a photonic device 308. Each photonic device 308 can either be an optical transmitter or receiver. Each surface cavity 306 is also covered with a respective lens 310. Each lens 310 can also be specially manufactured to either magnify or intensify a light signal to increase optical coupling efficiency. In some embodiments, a single lens can have a region that magnifies light while another region attenuates light signals. Each lens 310 is attached to support block 304 through metal boundary lines 316 to ensure the hermetic seal around surface cavity 306.

Figure 4:
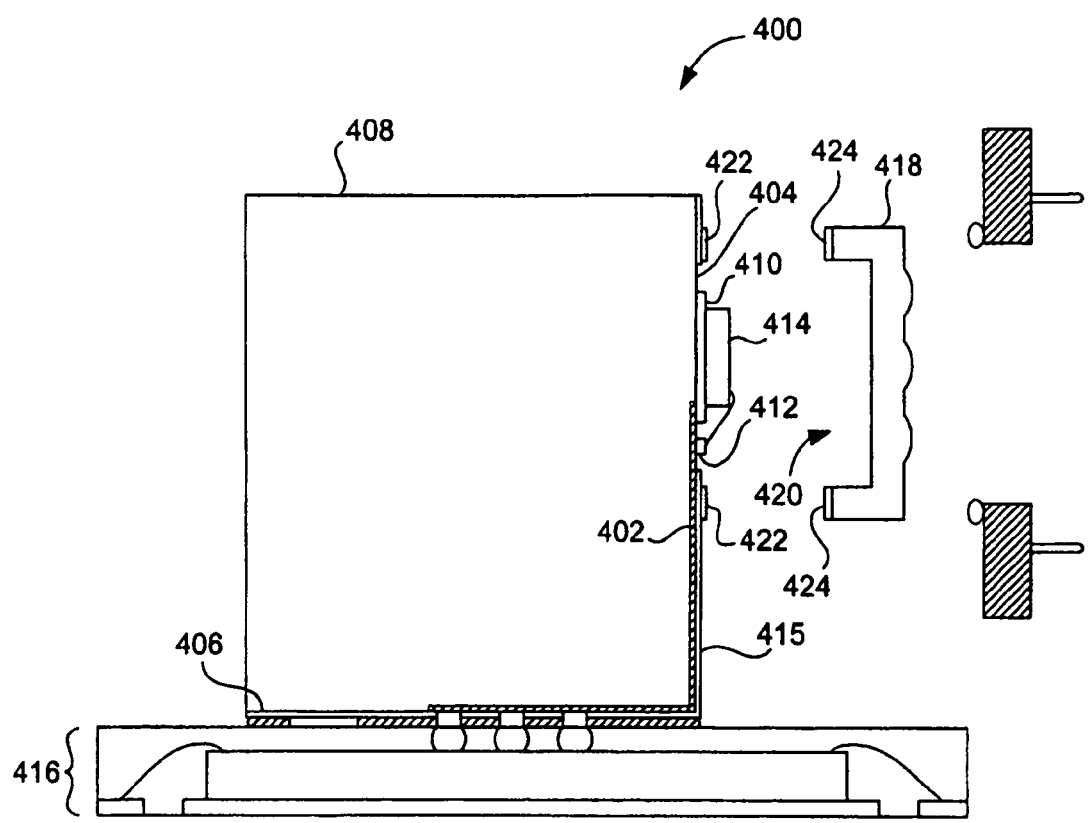
FIG. 4 illustrates a cross-sectional view of an optoelectronic system according to another alternative embodiment of the present invention.

FIG. 4 illustrates a cross-sectional view of an optoelectronic system 400 according to another alternative embodiment of the present invention. In system 400, multiple electrical traces 402 run along the supporting surface 404 and the bottom surface 406 of support block 408. Electrical traces 402 connect cathode pad 410 and anode contact pads 412 to respective contact pads located on bottom surface 406 of support block 408 thereby facilitating the electrical connection between photonic device 414 and chip subassembly 416. Electrical traces 402 are shown to be embedded within support surface 404 and bottom surface 406. However, electrical traces 402 can also be formed on top of these surfaces. In order to preserve the hermetic seal within which photonic device 414 is contained, a layer of glass 415 is formed over electrical traces 402. In this way, the electrical traces will not create a channel underneath lens 418 through which air or moisture can seep into lens cavity 420. This can happen if gaps between electrical traces 402 and the surrounding structure of support surface 404 form. These gaps can be so large that metal boundary lines 422 and 424 cannot sufficiently fill in these gaps to ensure a hermetic seal. Therefore, glass layer 415 is formed over electrical traces 402 and the portion of support surface 404 surrounding each of electrical traces 402. As shown in FIG. 4, glass layer 415 also covers substantially all of support surface 404 and bottom surface 406 except for the areas where conductive contact pads are located. Specifically, no glass layer is formed on support surface 404 where cathode pad 410 and anode contact pad 412 are formed, and no glass layer is formed on bottom surface 406 wherever contact pads for making contact with chip subassembly 416 are formed. In an alternative embodiment, glass layer 415 can be formed in a more limited area that includes only a region where the rim of lens 418 makes contact with support surface 404. This glass lens formation would encircle photonic device 414, cathode pad 410, and anode contact pads 412.

Glass layer 415 can be applied to support block 408 using various techniques such as sputtering. Again, support block 408 is formed of an impermeable material such as a ceramic.

Figure 5:
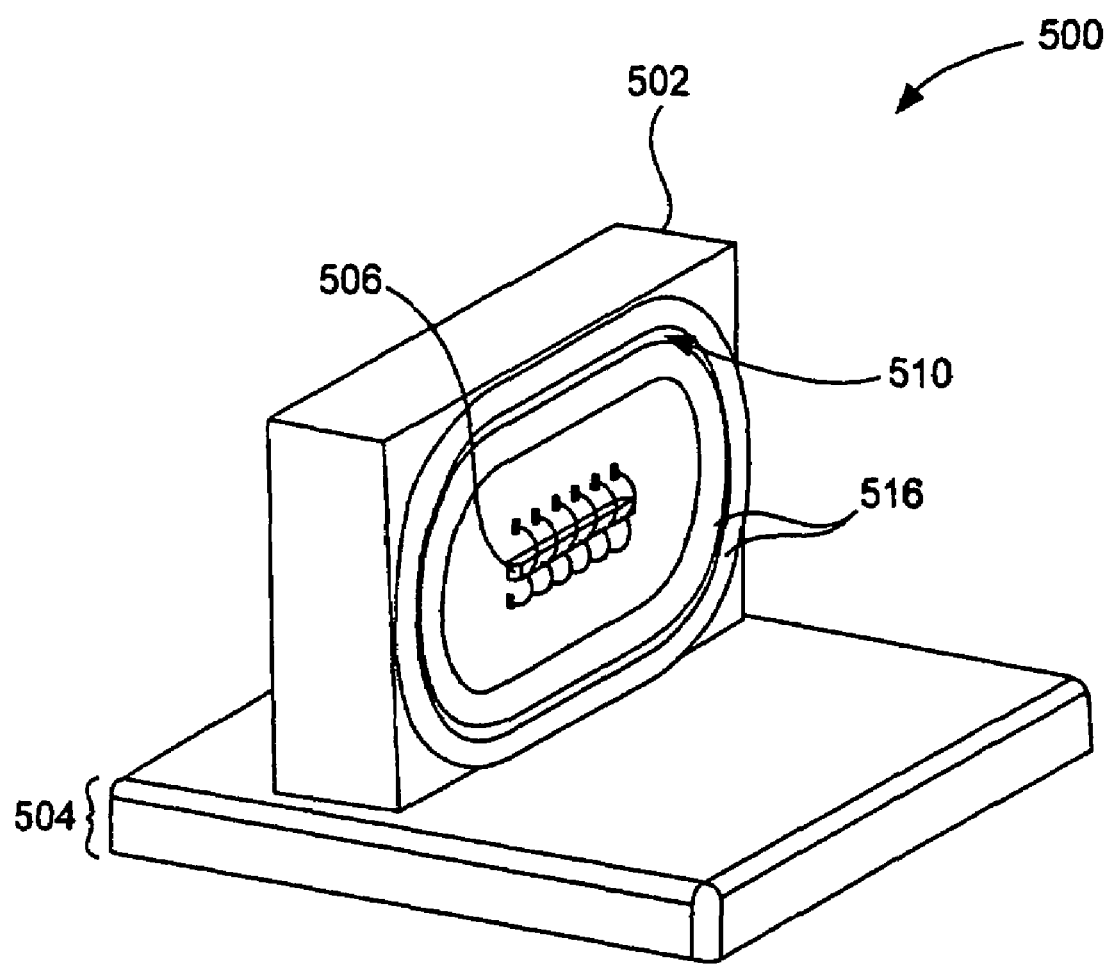
FIG. 5 illustrates a perspective view of a support block and a chip subassembly, which form an alternative embodiment of an optoelectronic system in which a photonic device is to be enclosed within a quasi-hermetic enclosure.
Figure 6:
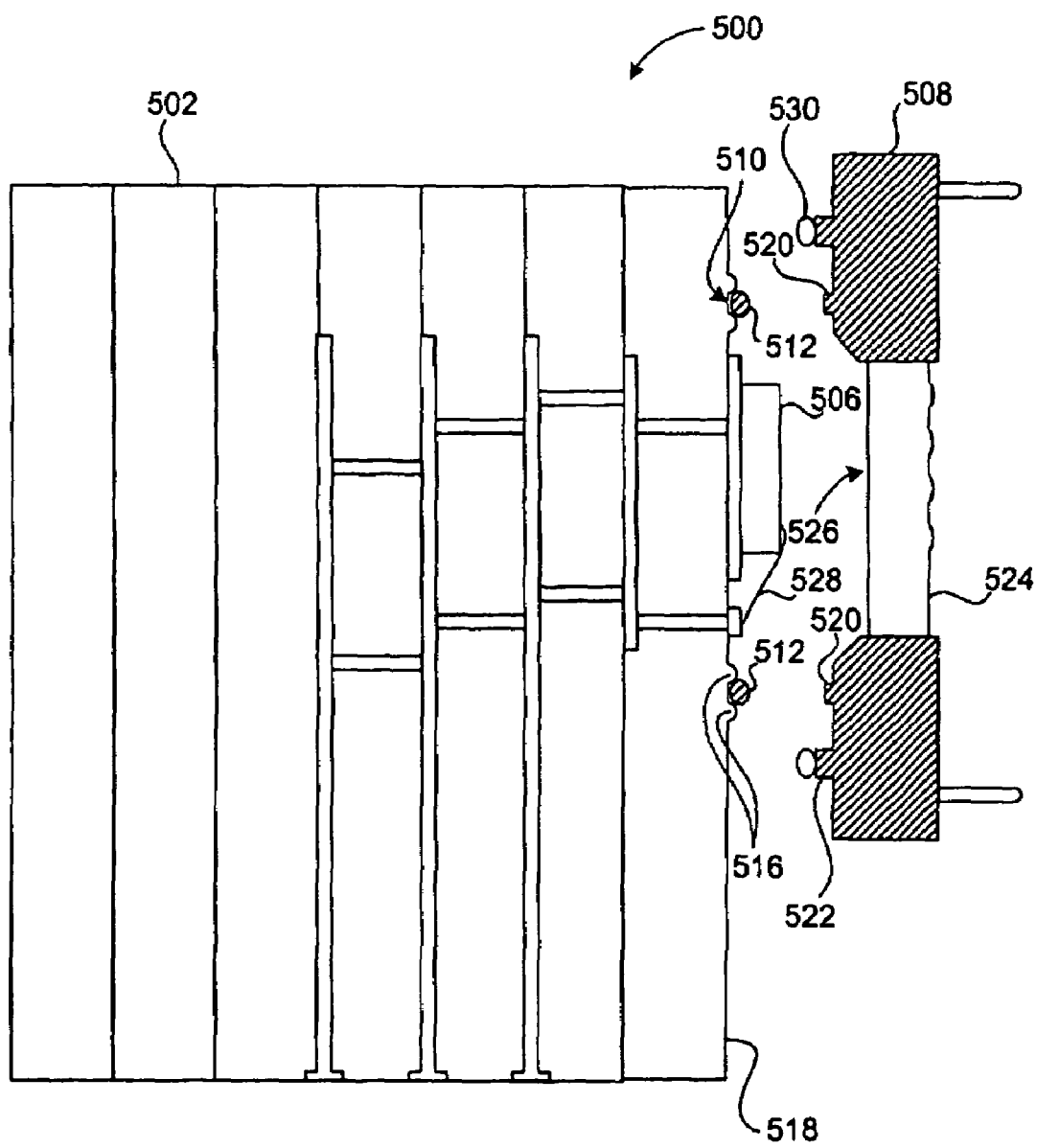
FIG. 6 illustrates a side cross-sectional view of optoelectronic system in which a support block and a receptacle are shown in an unassembled arrangement.

FIG. 5 illustrates a perspective view of a support block 502 and a chip subassembly 504, which form an alternative embodiment of an optoelectronic system 500 of the present invention. FIG. 6 illustrates a side cross-sectional view of optoelectronic system 500 in which support block 502 and receptacle 508 are shown in an unassembled arrangement. Optoelectronic system 500 is designed to seal photonic device 506 within a quasi-hermetic cavity. The packaging of system 500 is formed by setting receptacle 508 within a groove 510 that surrounds photonic device 506. Receptacle 508 has an opening that secures an optical lens 524. Optical lens 524 can be secured to receptacle 508 with adhesives such as an epoxy. Receptacle 508 and lens 524 combination forms a receptacle cavity 526 which is placed over photonic device 506 and thereby creates a quasi-hermetic seal over photonic device 506.

A high temperature elastic o-ring 512, which is set within groove 510, helps seal the enclosed area surrounding photonic device 506. O-ring 512 is loop of elastic material that conforms to the outline shape of groove 510 that encircles photonic device 506. The enclosure around photonic device is quasi-hermetic because O-ring is typically made out of heat resistant rubber, silicone, or other polymers, which allows for the transmission of moisture. The polymers used to form o-ring 512 will, over time, allow some moisture to diffuse in (and out) of the enclosure to reach certain equilibrium. This equilibrium will be governed by the operating conditions of the module (e.g., power on the photonics, heat dissipated by the photonic device 506, and the external environment).

Another reason why photonic device 506 is sealed within a quasi-hermetic enclosure is because common adhesives, such as epoxy, are used to secure lens 524 within receptacle 508. As mentioned above, most of such adhesives tend to outgas and therefore introduce gases into the enclosure. Low outgassing polymer materials are now commercially available and the materials that cure without outgassing are being developed.

Groove 510 is created with the parallel set of rails 516 that run around the perimeter of photonic device 506. Rails 516 are integrally formed from the material of the supporting surface 518 of support block 502. Receptacle 508 has a protruding receptacle rim 520 that is designed to fit into groove 510. O-ring 512 will correspondingly be compressed when rim 520 is set into groove 510. O-ring 512 serves to seal the enclosed area between receptacle 508 and support surface 518. The height, width, and separation of rails 516 can be adjusted depending upon the size of the O-ring and the size of receptacle rim 520 that is to be inserted into groove 510.

Standoff stems 522 also extend from receptacle 508. Standoff stems 522 make contact with support surface 508 and maintain a certain distance between receptacle 508 and support surface 518. Specifically, support stems 522 maintain a separation distance between conductive interconnecting wires 528 and lens 524. Interconnecting wires 528 tend to be fragile and are easily broken. Therefore, standoff stems 522 serve to protect interconnecting wires 528 and the connection of photonic device 506 to the electrical traces within support block 502. Standoff stems 522 can be multiple individual stems or a continuous rim that extends around rim 520. The shape and size of standoff stems 522 can vary so long as stems 522 serve to maintain the required separation distance between lens 524 and support surface 518.

Standoff stems 522 are located outside of the receptacle rim 520 and therefore make contact with support surface 518 outside of the quasi-hermetically sealed receptacle cavity 526. Standoff stems are attached to support surface 518 using adhesive material 530. In an alternative embodiment, standoff stems 522 are located within the boundary created by receptacle rim 520.

Receptacle 508 can be formed of various materials such as plastic. Support block 502 need not be formed of impermeable material since the system 500 is a quasi-hermetic packaging configuration. However, in some embodiments, support block 502 can be formed of a ceramic material.

In an alternative embodiment, optoelectronic system 500 can be manufactured so that more than one receptacle can be attached to support surface 518. In this embodiment, support surface 518 can have multiple sets of parallel rails 516 and associated grooves 510. In this case, support surface would likely support multiple photonic devices 506, each being covered by a respective receptacle and lens combination.

In another embodiment, one receptacle has multiple openings with each opening supporting an optical lens. Each optical lens is supported over a photonic device and can be tailored to either intensify or attenuate light signals. In all embodiments of optoelectronic system 500, either light emitting or receiving devices can be attached to support surface 518 to create an optical transmitter, receiver, or transceiver.

Figure 10:
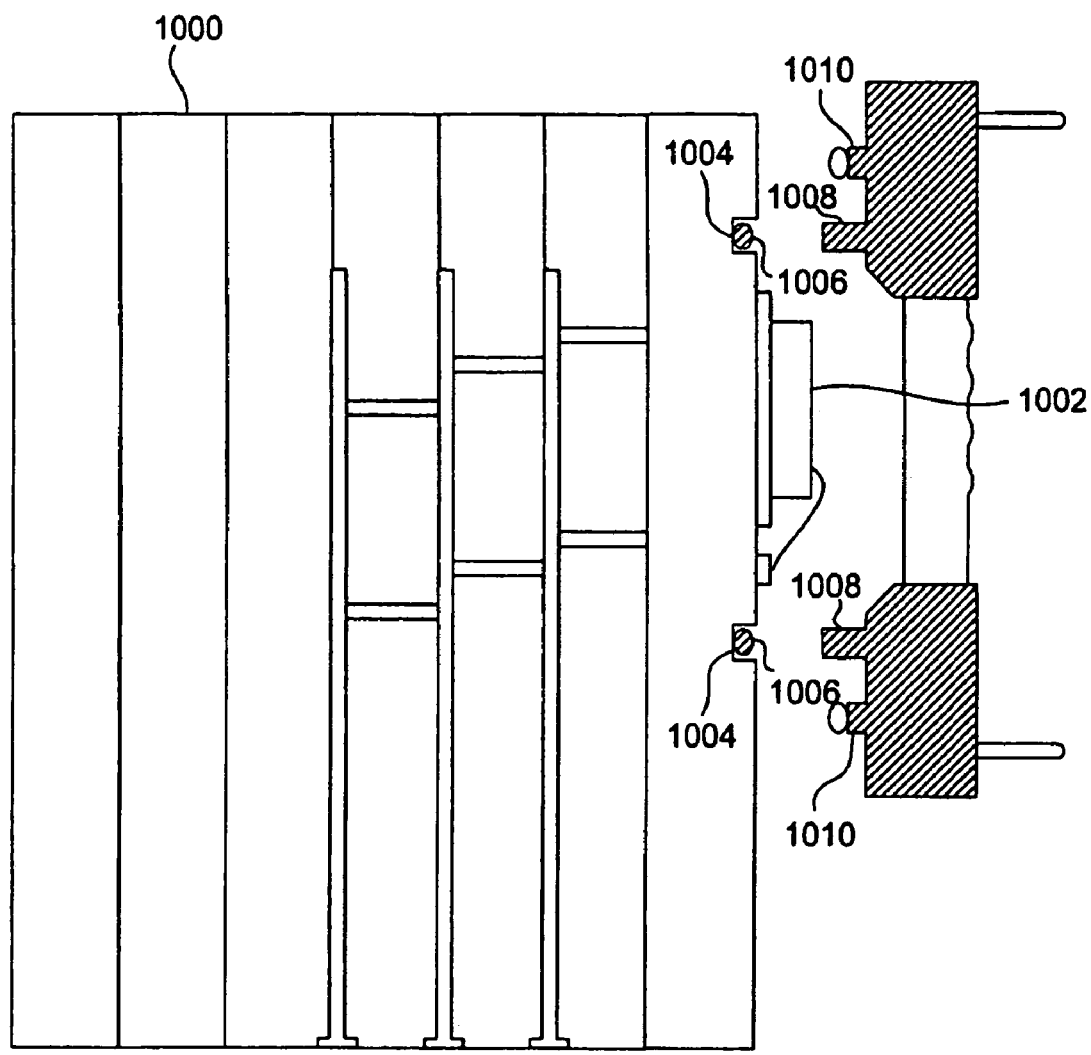
FIG. 10 illustrates an alternative embodiment of a support block that is designed to seal a photonic device within a quasi-hermetic environment.

FIG. 10 illustrates an alternative embodiment of a support block 1000 that is designed to seal a photonic device 1002 within a quasi-hermetic environment. Support block 1000 is different in that groove 1004 is set into the surface of block 1000. Groove 1004 encircles photonic device 1002 such that it has a circular or ovular outline shape on the supporting surface of support block 1000. Forming the inset groove 1004 allows protruding rails, as shown in FIGS. 5 and 6, to be optional. Actually, FIG. 10 does not utilize any protruding rails to form groove 1004. O-ring 1006 is set within groove 1004 and will be squashed when rim 1008 is inserted into groove 1004. The squashed o-ring 1006 acts to seal the connection between groove 1004 and rim 1008. In the embodiment of FIG. 10, rim 1008 is taller than rim 520 of FIGS. 5 and 6 since rim 1008 must extend into the inset groove 1004. Rim 1008 will also be taller than support stems 1010 since support stems 1010 make contact with the surface of support block 1000.

Figure 7:
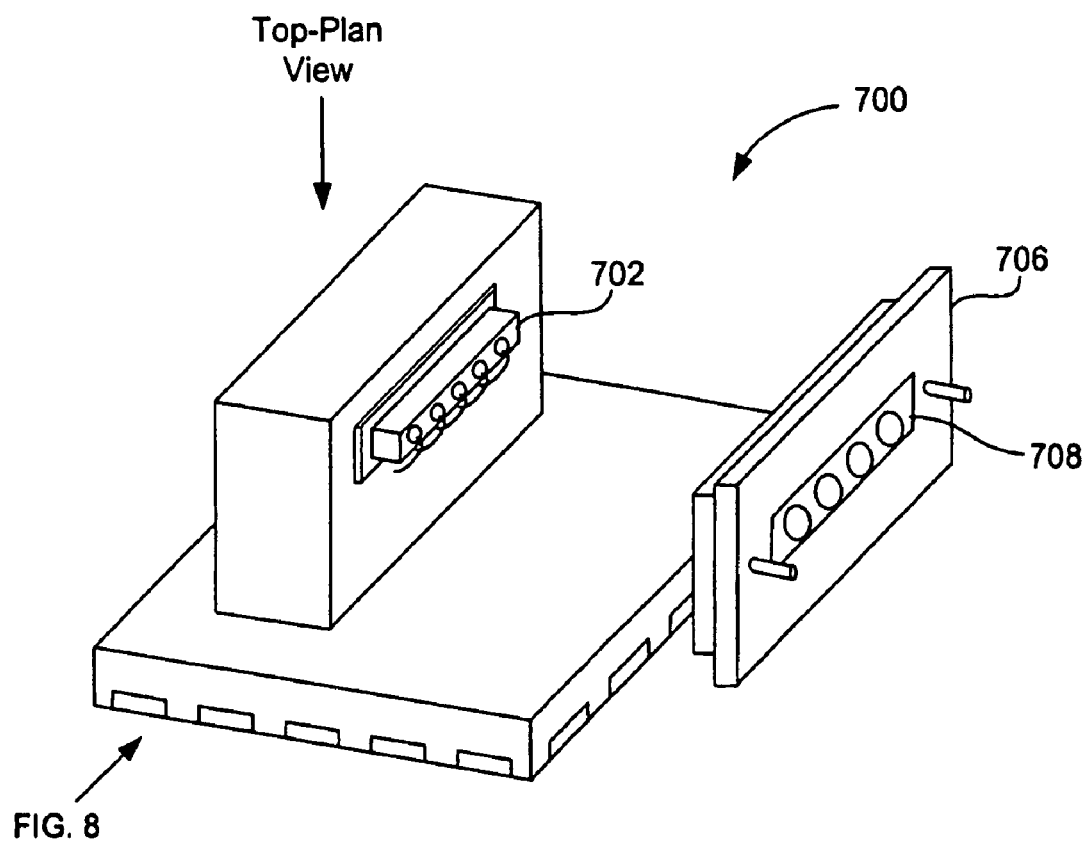
FIG. 7 illustrates a perspective view of an optoelectronic system that encloses a photonic device within a non-hermetic enclosure, according to one embodiment of the invention.
Figure 8:
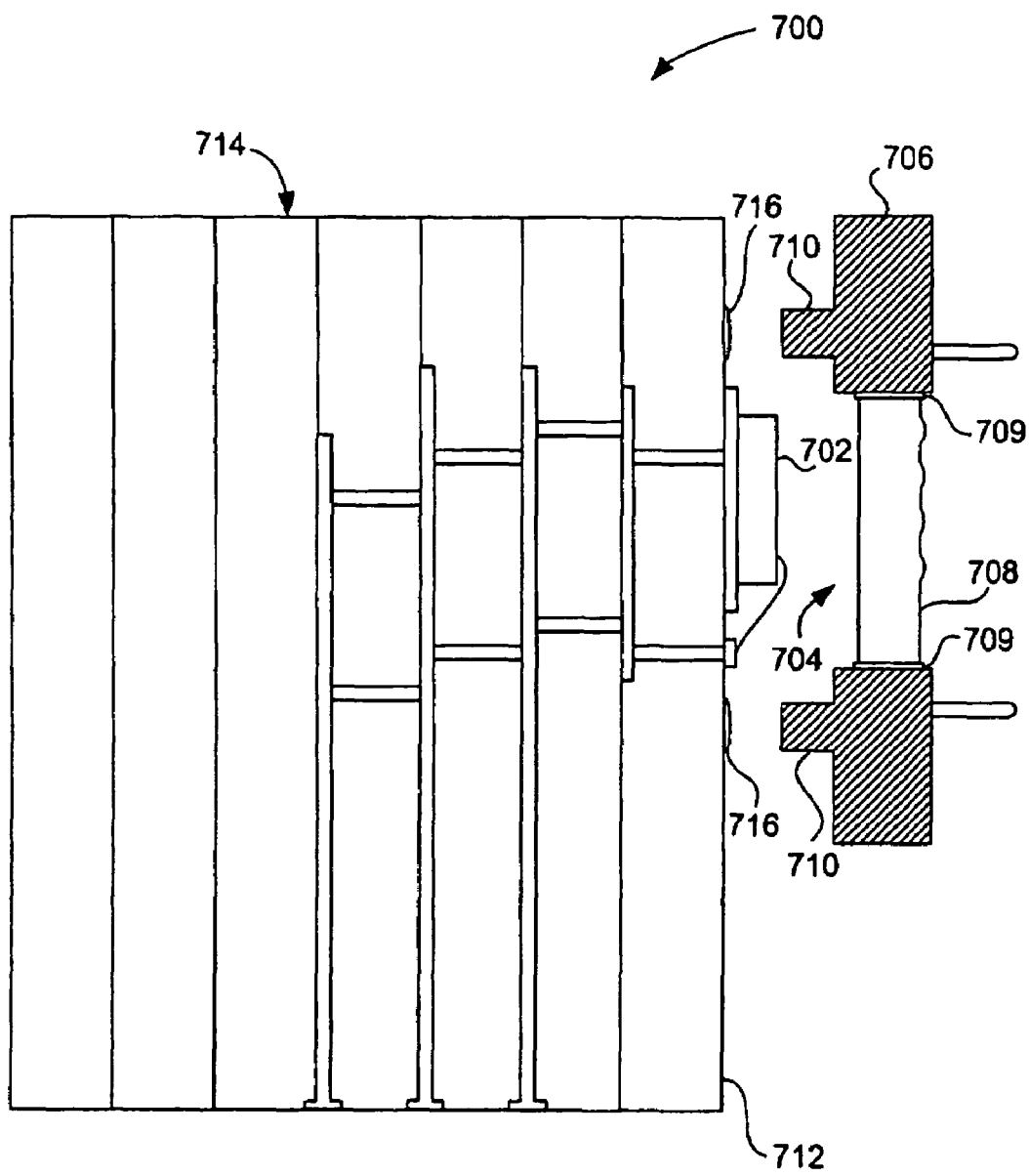
FIG. 8 illustrates a side plan, cross-sectional view of the optoelectronic system shown in FIG. 7.

FIG. 7 illustrates a perspective view of an optoelectronic system 700 that encloses a photonic device 702 within a non-hermetic enclosure, according to one embodiment of the invention. FIG. 8 illustrates a side plan, cross-sectional view of optoelectronic system 700 shown in FIG. 7. Photonic device 702 is enclosed within a receptacle cavity 704 that is created with receptacle 706 and lens 708. Receptacle 706 has an opening that secures lens 708 so that lens 708 will be secured over photonic device 702. Lens 708 is secured to receptacle 706 with adhesive material 709, such as epoxy. Receptacle 708 also has a receptacle rim 710 that encircles lens 708. Receptacle rim 710 defines part of receptacle cavity 704 and is attached to support surface 712 of support block 714 with adhesive material 716. The use of adhesive material to attach lens 708 to receptacle 706 and receptacle 706 to support surface 712 allows the possibility of the adhesive materials to outgas into receptacle cavity 704. Because of this, receptacle cavity 704 is not completely hermetically sealed. In one embodiment, a low shrinkage, low moisture absorption and low out-gassing epoxy material is used as the adhesive agent.

Photonic device 702 is protected from physical damage since receptacle rim 710 is a solid rim that completely encircles lens 708. This configuration allows photonic device 702 to be completely sealed within receptacle 706 and lens 708. In an alternative embodiment, receptacle rim 710 can be composed of individual stems that do not enclose photonic device 702 within a completely enclosed receptacle cavity 704.

Figure 9:
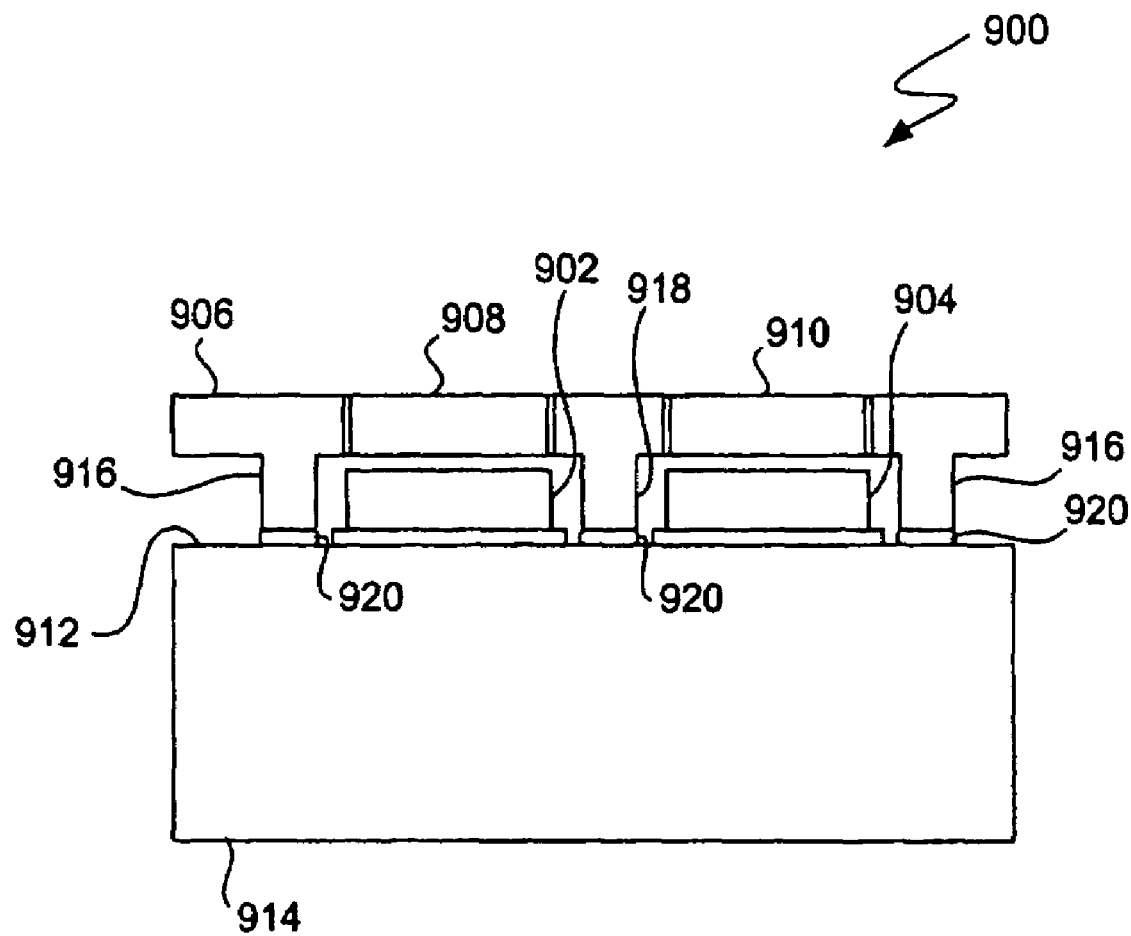
FIG. 9 illustrates a top plan, cross-sectional view of an optoelectronic system that encloses photonic devices within a non-hermetic enclosure, according to an alternative embodiment of the invention.

FIG. 9 illustrates a top plan, cross-sectional view of an optoelectronic system 900 that encloses photonic devices 902 and 904 within a non-hermetic enclosure, according to an alternative embodiment of the invention. System 900 includes a receptacle 906 that has two openings that each secure a respective optical lens 908 and 910. Lenses 908 and 910 are secured within the openings with an adhesive agent such as epoxy. Lenses 908 and 910 can be designed to either intensify or attenuate light signals depending upon the type of photonic device that they cover. Again, photonic devices 902 and 904 can both be optical transmitters, optical receivers, or one of each.

Receptacle 906 is attached to supporting surface 912 of support block 914 at points surrounding each of photonic devices 902 and 904. Receptacle 906 is attached to support surface 912 with receptacle rim 916, which completely surrounds photonic devices 902 and 904. Receptacle bar 918 extends between photonic devices 902 and 904 provides for additional attachment regions between receptacle 906 and support surface 912. Receptacle bar 918 is a solid structure that completely separates photonic devices 902 and 904. Receptacle rim 916 and bar 918 completely enclose photonic devices within respective enclosures and thereby protect photonic devices 902 and 904 from structural damage. Receptacle rim 916 and receptacle bar 918 are attached to support surface 912 with adhesive material 920.

In alternative embodiments, receptacle rim 916 and bar 918 can be substituted with multiple standoff stems that are separate from each other.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. An optical transmission device comprising:
    a support block having a supporting surface and a mounting surface, each arranged on adjacent surfaces of the support block, the support surface including a cathode pad and a plurality of anode pads, the cathode pad being large enough to enable a photonic device to be mounted thereon, and the mounting surface comprising a substantially flat mounting surface having a plurality of contact pads formed on the mounting surface;
    a first photonic device mounted on the cathode pad, the photonic device being electrically connected with the cathode pad and electrically connected to at least one of the anode pads;
    an optical lens element mounted to the supporting surface over the first photonic device;
    a receptacle mounted with the optical lens element to secure the lens element to the supporting surface; and
    electrical traces that connect the cathode and anode pads with respective contact pads of the mounting surface.

2. The optical transmission device as recited in claim 1, wherein the receptacle secures the optical lens element such that it is positioned above the first photonic device.

3. The optical transmission device as recited in claim 2, wherein the receptacle secures the first glass lens with a second adhesive material.

4. The optical transmission device as recited in claim 2, wherein the receptacle includes a rim that is in contact with the supporting surface.

5. The optical transmission device as recited in claim 4, wherein the adhesive material is applied to the contact area between the rim and the supporting surface.

6. The optical transmission device as recited in claim 4, wherein the rim encircles the first glass lens.

7. The optical transmission device as recited in claim 1, wherein the receptacle includes a receptacle cavity that fits over the photonic device, whereby the photonic device is sealed between the supporting surface and the receptacle.

8. The optical transmission device recited in claim 1 further comprising:
    a packaged semiconductor device package that includes a semiconductor die that is packaged within a protective molding material, the packaged semiconductor device package being attached to the mounting surface of the support block.

9. The optical transmission device as recited in claim 8, wherein the packaged semiconductor device package includes a set of electrical contact surfaces that are attached to the contact pads on the mounting surface of the support block.

10. The optical transmission device as recited in claim 9, wherein the packaged semiconductor device package includes a second set of contact surfaces capable of being connected to an external system.

11. The optical transmission device of claim 1 wherein the electrical traces that connect the cathode and anode pads with respective contact pads pass through interior portions of the support block.

12. The optical transmission device of claim 1 wherein the receptacle includes an inner cavity configured such that when the receptacle is mounted to the supporting surface the inner cavity exposes the photonic device; and
    wherein a lens element is mounted on the supporting surface to seal the cavity in the receptacle and enclose the photonic device.

13. An optical transmission device as recited in claim 1
    wherein the optical lens element is mounted to the supporting surface and is arranged over the photonic device to encapsulate the photonic device, the plurality of anode pads, and the at least one cathode pad;
    wherein the receptacle is mounted to the lens element to encapsulate the lens element, the photonic device, the plurality of anode pads, and the at least one cathode pad.

14. The optical transmission device as recited in claim 1 wherein
    the supporting surface of the support block includes a sealing groove that surrounds the first photonic device;
    an elastic seal is arranged in the sealing groove; and
    the receptacle is sealed against the elastic seal to enable a semi-hermetic seal for the first photonic device.

15. The optical transmission device as recited in claim 14 wherein the receptacle further includes stand off stems arranged to set the optical lens element at a desired distance from photonic device.

16. The optical transmission device of claim 1 wherein the electrical traces that connect the cathode and anode pads with respective contact pads pass through interior portions of the support block.

17. The optical transmission device of claim 1 wherein the electrical traces that connect the cathode and anode pads with respective contact pads are arranged on the mounting surface and extend along the supporting surface to electrically connect with the respective contact pads of the supporting surface.

* * * * *